(12) United States Patent
McClanahan et al.

(10) Patent No.: US 7,536,231 B2
(45) Date of Patent: May 19, 2009

(54) METHOD FOR DETERMINING ACCEPTABILITY OF PROPOSED COLOR SOLUTION USING AN ARTIFICIAL INTELLIGENCE MODEL

(75) Inventors: Craig J. McClanahan, Bowling Green, OH (US); James Soss, Toledo, OH (US)

(73) Assignee: BASF Corporation, Southfield, MI (US)

( * ) Notice: Subject to any disclaimer, the term of this patent is extended or adjusted under 35 U.S.C. 154(b) by 582 days.

(21) Appl. No.: 11/118,982

(22) Filed: Apr. 28, 2005

(65) Prior Publication Data

US 2005/0240543 A1  Oct. 27, 2005

Related U.S. Application Data

(63) Continuation-in-part of application No. 09/874,699, filed on Jun. 5, 2001, now abandoned.

(51) Int. Cl.
*G05B 13/02* (2006.01)
(52) U.S. Cl. ...................................................... 700/32
(58) Field of Classification Search ................... 700/30, 700/31, 32, 48
See application file for complete search history.

(56) References Cited

U.S. PATENT DOCUMENTS

| | | | | |
|---|---|---|---|---|
| 4,813,000 A * | 3/1989 | Wyman et al. | ............... | 382/165 |
| 5,410,637 A * | 4/1995 | Kern et al. | ..................... | 706/52 |
| 5,548,697 A * | 8/1996 | Zortea | ........................... | 706/2 |
| 5,774,230 A * | 6/1998 | Goto | ........................... | 382/162 |
| 5,841,421 A * | 11/1998 | Cheetam et al. | ............. | 345/593 |
| 5,907,495 A * | 5/1999 | Snyder et al. | ................... | 703/6 |
| 6,108,095 A * | 8/2000 | Graf | .......................... | 356/425 |
| 6,342,952 B1 * | 1/2002 | Chan | .......................... | 358/1.9 |
| 6,522,977 B2 * | 2/2003 | Corrigan et al. | ............... | 702/32 |
| 6,563,510 B1 * | 5/2003 | Rice et al. | ................... | 345/593 |
| 2003/0163262 A1* | 8/2003 | Corrigan et al. | ............... | 702/32 |

OTHER PUBLICATIONS

Usui et al, ; "Neural Networks for Device-Independent Digital Color Imaging"; Elseiver; Apr. 15, 1999.*

* cited by examiner

*Primary Examiner*—Albert DeCady
*Assistant Examiner*—Chad Rapp
(74) *Attorney, Agent, or Firm*—Howard & Howard Attorneys PLLC (57) ABSTRACT

A method for determining if a proposed color solution, such as paint, pigments, or dye formulations, is acceptable, is provided. The inputs to the system are the actual color values of an item, differential color values, a proposed color solution, and second color values associated with the proposed color solution. The system includes an artificial intelligence model to analyze the inputs and produce an output for communicating whether the proposed color solution is acceptable. The artificial intelligence model may be embodied in a neural network.

16 Claims, 5 Drawing Sheets

METHOD FOR DETERMINING ACCEPTABILITY OF PROPOSED COLOR SOLUTION USING AN ARTIFICIAL INTELLIGENCE MODEL

RELATED APPLICATION

The subject patent application is a continuation-in-part of U.S. patent application Ser. No. 09/874,699, which was filed on Jun. 5, 2001.

FIELD OF THE INVENTION

The present invention relates generally to color matching, and more particularly, to a method for assessing an acceptability of a color match using artificial intelligence.

BACKGROUND OF THE INVENTION

Modern vehicles, such as automobiles, are typically offered to consumers in a wide variety of paint colors. In fact, from model year to model year, it is not uncommon for a particular vehicle model to be available in several new paint colors. Variations in the actual paint color and appearance of the paint color may arise from a number of factors, such as changes in paint formulation, effect degradation, and variations in the paint application process or equipment. Consequently, when a vehicle's body panels are damaged and require repairs (including repainting), the paint manufacturer supplies one or more paint formulations for the original paint color to customers, such as repair shops.

By supplying a plurality of formulations or variants for a particular color, the paint manufacturer accounts for those factors which affect the actual color. Typically, the formulations for a particular color are distributed to repair shops on paper, microfiche, or compact disks (CD). A color tool, composed of swatches of the variants for each color, may also be produced and delivered to each customer.

The customer must then attempt to select which formulation most closely matches that part to be painted. This is typically done visually by comparing swatches to the part or by spraying a test piece with each formulation.

Different formulations can be derived from actual data gathered by inspectors at various locations such as the automobile manufacturer or vehicle distribution point. The inspectors also take color measurement readings from new automobiles which have a particular paint color. These readings are used to develop a variety of color solutions, i.e., different paint formulations for the same color.

There are several disadvantages to the present method of color matching the part to be painted in this manner. Conventional color laboratories mainly use human analysis to determine color match quality. This method requires significant numbers of people, equipment and materials for identifying pigments and locating a close match from a database. In some cases, an existing formula may provide a close match. In other cases, the formula must be adjusted, mixed, sprayed and compared to the standard. This step is repeated until a suitably close match is found. In still other cases, no match is found and a formula must be developed from scratch. Correction of the formula requires a highly skilled technician proficient in the interaction of light with several different pigments.

Moreover, traditional computer software that assists a technician has several disadvantages. Traditional computer software has not proven to be very effective on colors containing "effect pigments." This software is typically based on a physical model of the interaction between illuminating light and the coating. These models involve complex physics and do not account for all aspects of the phenomena. A traditional approach is to use a model based on the work of Kubelka-Munk or modifications thereof. The model is difficult to employ with data obtained from multi-angle color measuring devices. One particular difficulty is handling specular reflection that occurs near the gloss angle. Another deficiency of the Kubelka-Munk based models is that only binary or ternary pigment mixtures are used to obtain the constants of the model. Thus, the model may not properly account for the complexities of the multiple interactions prevalent in most paint recipes.

Acceptable tolerances of a color match vary depending on the color. Tolerances are typically expressed in differential color values, e.g., $\Delta L^*$, $\Delta C^*$, $\Delta H^*$ or $\Delta L^*$, $\Delta a^*$, $\Delta b^*$. The differential values will vary as a function of the color. Historically, these values have been determined manually, i.e., by visual evaluation. The tolerances for a formulation are determined as a function of all of the color measurement values which have been deemed acceptable (usually by visible methods). Attempts have been made to build uniform tolerance equations from the differential color values. These equations are not wholly adequate and still require the establishment of various parameters by the user for a particular application.

The present invention is aimed at one or more of the problems identified above and provides a unique method of determining an acceptability of a color match.

SUMMARY OF THE INVENTION AND ADVANTAGES

The subject invention includes a method of determining an acceptability of a proposed color solution for an item using a computer and an artificial intelligence model. The method includes the step of determining actual color values associated with the item. The actual color values are then inputted into the computer. The proposed color solution and associated second color values are determined based on the inputted actual color values. The differences between the actual color values and the second color values are calculated by utilizing the computer to define differential color values. The actual color values and the differential color values are then inputted into the artificial intelligence model. The subject invention then determines if the proposed color solution is acceptable by utilizing the artificial intelligence model. An output signal indicative of the acceptability of the proposed color solution is produced.

Another aspect of the present invention includes a method for providing proposed color solutions using an artificial intelligence model to a customer over a computer network. The method includes the step of receiving actual color values from the customer located at a remote location. The actual color values are delivered from the remote location to a central location over the computer network. The actual color values are then inputted into a computer. A composite solution database associated with the computer is searched to determine a proposed color solution and associated second color values based on the inputted actual color values. The differences between the actual color values and the second color values are calculated utilizing the computer to define differential color values. The actual color values and the differential color values are then inputted into the artificial intelligence model. The subject invention determines if the proposed color solution is acceptable by utilizing the artificial intelligence model. An output signal indicative of the acceptability of the proposed color solution is produced.

The subject invention preferably embodies the artificial intelligence model in a neural network having an input layer, a hidden layer, and an output layer. A method of training the neural network to determine the acceptability of a proposed color solution is also included. The method of training the neural network includes the step of inputting actual color values and differential color values to the input layer. A proposed color solution associated with the actual color values and differential color values is inputted into the input layer. A weighted factor to the color values in the hidden layer is used to produce an output signal indicative of the acceptability of the proposed color solution. The output signal is then provided to a comparator. A known acceptability of the proposed color solution is inputted into the comparator. The output signal and the known acceptability are compared for producing an error value. The error value is compared to an error limit to determine error variation. Error feedback is provided to the neural network corresponding to the error variation, wherein the weighted factor is adjusted according to the error feedback.

Accordingly, the subject invention includes a method of determining an acceptability of a proposed color solution, which can be over a computer network. The subject invention also includes a method of training a neural network to determine the acceptability of the proposed color solution. These methods overcome the deficiencies of the prior art and can be of great value to customers attempting to color match various items.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
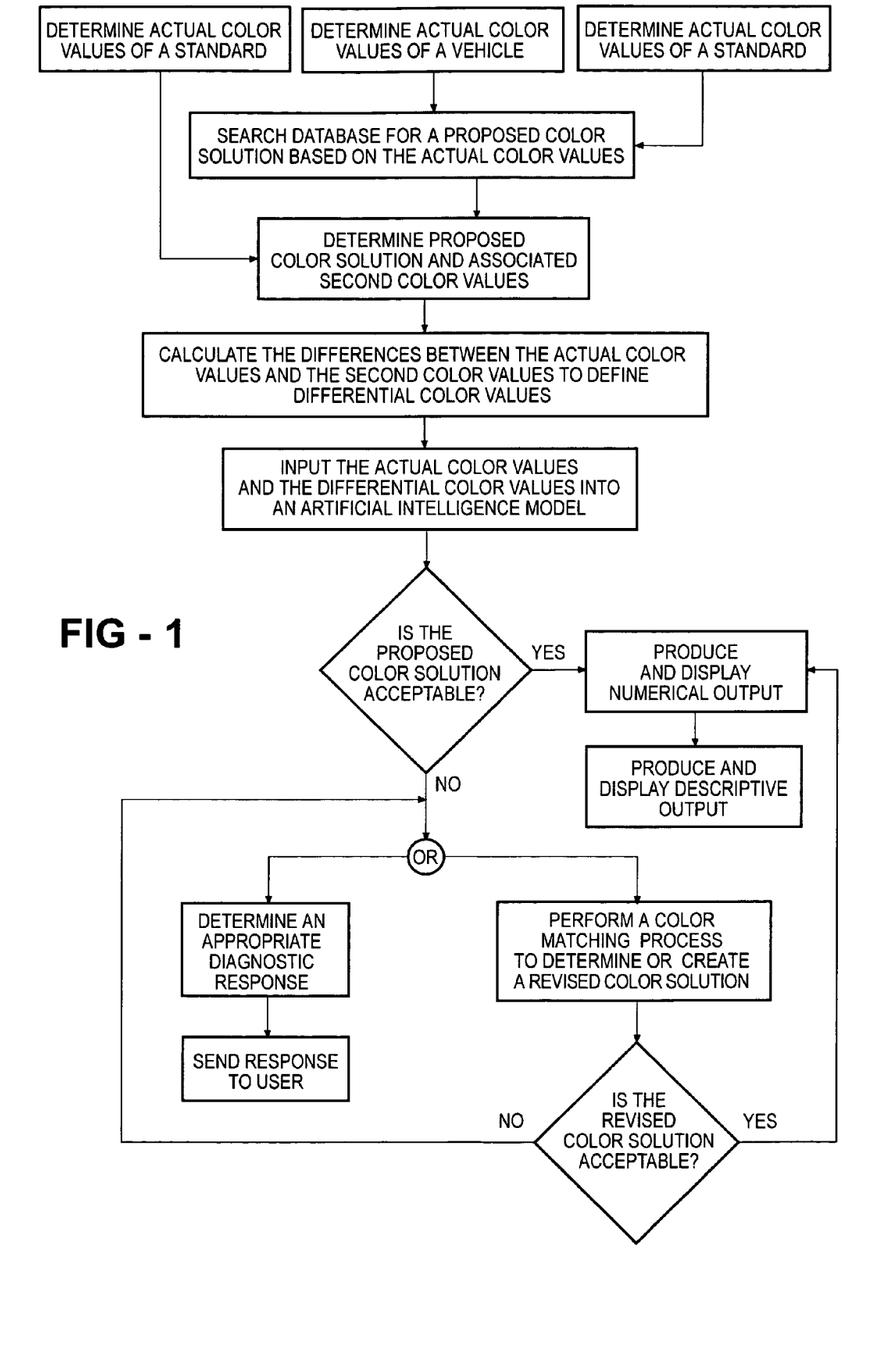
FIG. 1 is a block diagram of a method for determining the acceptability of a proposed color solution having an artificial intelligence model.

Referring to the Figures, wherein like numerals indicate like or corresponding parts throughout the several views, a method of color matching and determining if a proposed color solution, such as paint, pigments, or dye formulations, is acceptable, is provided in FIG. 1.

The method of determining the acceptability of the proposed color solution utilizes a system having a computer and an artificial intelligence model. As discussed in greater detail below, the artificial intelligence model preferably contains a neural network. To begin the method, actual color values associated with an item are determined. The item may be, for example, a vehicle or a component of the vehicle to be repaired such that the proposed color solution developed by the method is utilized by a vehicle repair shop. Alternatively, the item could be a sample or standard used in a laboratory such that the proposed color solution developed by the method is utilized by a paint manufacturer.

Color values are an indication of the color of an item. Specifically, color values refer to color attributes used to quantify color. The color values may include color space values, reflectance values or other suitable color attributes. One example of color space values are defined by $L^*a^*b^*$, where $L^*$ represents luminous intensity, $a^*$ represents a red/green appearance, $b^*$ represents a yellow/blue appearance. Another example of color space values are defined by $L^*$, $C^*$, h, where $L^*$ represents lightness, $C^*$ represents chroma, and h represents hue.

The actual color values for the component of the vehicle to be repaired are the actual color attributes of this component and are preferably obtained using a multi-angle or spherical geometry color measuring device, a spectrophotometer, digital camera or other suitable device. The actual color values for the standard used in a laboratory are the actual color attributes of the standard and are already known and are typically printed on the standard itself.

Once determined, the actual color values are input into the computer. Preferably, the system includes a computer program run on the computer. The input device may be embodied in a user interface for inputting the actual color values, such as a keyboard. Furthermore, the input device may be embodied in an element of a computer system so as to receive the actual color values as input from another element of the computer system, such as a computer database, an electronic mail file or other suitable element of the computer system.

The proposed color solution and associated second color values are then determined. The second color values for the proposed color solution are the color attributes of the proposed color solution. Preferably, a computer database is searched to determine the proposed color solution and associated second color values based on the inputted actual color values. Even more preferably, the proposed color solution is a proposed paint formulation to be used in the repair of a vehicle component. Alternatively, the proposed color solution may be known, which can be the case when the color matching process is performed in a laboratory.

The differences between the actual color values and the second color values are calculated by utilizing the computer to define differential color values. The differential color values are typically expressed as $\Delta L^*$, $\Delta C^*$, $\Delta h^*$ or $\Delta L^*$, $\Delta a^*$, $\Delta b^*$. The calculation to determine the differential color values may be accomplished using any suitable mathematical calculation as is known in the art.

Preferably, the actual color values and the differential color values are then input into the artificial intelligence model. The inputting of these values focuses and assists the artificial intelligence model to determine the most accurate acceptability rating for the proposed color solution. The artificial intelligence model is utilized to determine if the proposed color solution is acceptable.

Figure 2:
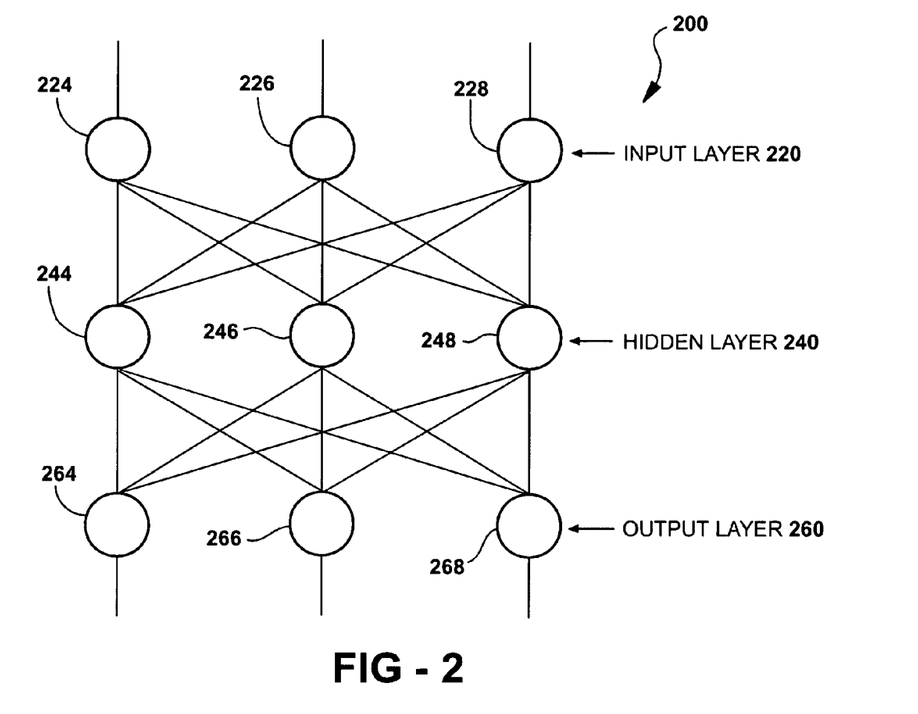
FIG. 2 is a diagram depicting a neural network for use in the artificial intelligence model of FIG. 1.

The artificial intelligence model may be embodied in a neural network. More specifically, the artificial intelligence model may be a back propagation neural network or any other suitable neural network. Referring to FIG. 2, a neural network is generally shown at 200. Neural networks 200 are computing systems that model vertebrate brain structure and processes. Neural network techniques are a member of a group of methods which fall under the umbrella of artificial intelligence. Artificial intelligence is commonly associated with logic rule-based expert systems where the rule hierarchies used are reasoned from human knowledge. In contrast, neural networks 200 are self-trained based on experience acquired through data compilation and computation. Thus, artificial intelligence utilizing neural networks 200 is particularly useful in conjunction with complex systems or phenomena where the analysis is complicated, and deriving a model from human knowledge for use in a conventional expert system is a daunting task.

Although neural networks differ in geometry, activation function and training mechanics, they are typically organized into at least three layers. The first layer is an input layer 220 having one or more input nodes 224, 226, 228. The second layer is an output layer 260 having one or more output nodes 264, 266, 268. Each output node 264, 266, 268 corresponds with an input node 224, 226, 228. Between the input 220 and output 260 layers, there are one or more hidden layers 240, each having one or more hidden nodes 244, 246, 248 corresponding to an input node and output node pair 224, 264, 226, 266, 228, 268. Each input variable is associated with an input node 224, 226, 228 and each output variable is associated with an output node 264, 266, 268. Within the neural network 200, data flows in only one direction, such that each node 224, 226, 228, 244, 246, 266, 268 only sends a signal to one or more nodes and receives no feedback.

The enabling power of a neural network 200 is its connectivity, or the connections between the various nodes 224, 226, 228, 244, 246, 248, 264, 266, 268. (A configuration technique modeled after the structure of the human brain.) Moreover, because the network is structured, or connected, in such a way as to provide parallel processing (where each node 224, 226, 228, 244, 246, 248, 264, 266, 268 has connections with other nodes 224, 226, 228, 244, 246, 248, 264, 266, 268), it is extremely efficient at acquiring and storing experiential knowledge and, then recalling and using that knowledge. More specifically, a node 224, 226, 228, 244, 246, 248, 264, 266, 268 receives the input, processes this input and provides an output. The processing step includes summing the inputs, adding a bias value and submitting this total input to an activation function which limits the magnitude of the output. The connections between the various nodes 224, 226, 228, 244, 246, 248, 264, 266, 268 are weighted. An output sent from one node 224, 226, 228, 244, 246, 248, 264, 266, 268 to another is multiplied by the weighting factor associated between those two particular nodes 224, 226, 228, 244, 246, 248, 264, 266, 268. The weighting factor represents the knowledge of the system. The system continues to accumulate knowledge and adjust the weighting factor in accordance with training and the further acquisition of knowledge by the network 200. Consequently, the output of the network 200 agrees with the experience of the network 200.

Referring back to FIG. 1, if the proposed color solution is determined to be within a range of acceptability, an output is produced, which is indicative of the acceptability of the proposed color solution. The output can be transformed into any desired format. For example, the output could be transformed into a numerical variable indicative of the acceptability of the output. The numerical variable could be a single continuous variable that may assume any value between two endpoints. An example being the set of real numbers between 0 and 1. This single numerical variable could then be displayed on a monitor of the computer. As a further example, the numerical variable could displayed as a fuzzy variable set or any other suitable format.

A fuzzy variable set is the basis for a mathematical system of fuzzy logic. "Fuzzy" refers to the uncertainty inherent in nearly all data. Fuzzy logic may be used in artificial intelligence models, specifically neural networks, because there is a fuzziness in the output of the neural network. Fuzzy logic is based on fuzzy variables. Inputs to a neural network may be provided for the fuzziness associated with each network parameter. An output depicting the fuzziness of the result could also be incorporated into the neural network. The output could range in value from 0 to 1, with a 1 indicating no uncertainty in the result. For example, when gauging color match quality, there may be uncertainty in the measurement of the color values and in the output relating to the goodness of the match. A fuzzy variable set output from the neural network indicates the level of uncertainty and the quality of the result. Thus, the quality confidence of a color match may be expressed as 0.9 or 0.8, where the quality is rated as very good at 0.9 and the confidence, or level of certainty, is quite high at 0.8.

The output could be transformed into a descriptive output indicative of the acceptability of the output. This descriptive output could also be displayed. In particular, the descriptive output could include an acceptable/moderately acceptable/not acceptable format, an acceptance factor format or any other suitable format.

If the proposed color solution is determined to be outside a range of acceptability, one or more additional steps could occur. For example, a diagnostic or error type message could be determined and sent to the user to assist the user in correcting the inputs. Alternatively, the computer and artificial intelligence model could perform a color matching process to determine or create a revised color solution. The color matching process could include performing an additional search through the computer database to locate the revised color solution. The color matching process could alternatively create a new color solution, i.e., new paint formulation, as the revised color solution. The artificial intelligence model will then determine if the revised color solution is acceptable. If acceptable, an output as discussed above is produced. If not acceptable, the steps of sending a diagnostic response or color matching discussed above are repeated.

Figure 3:
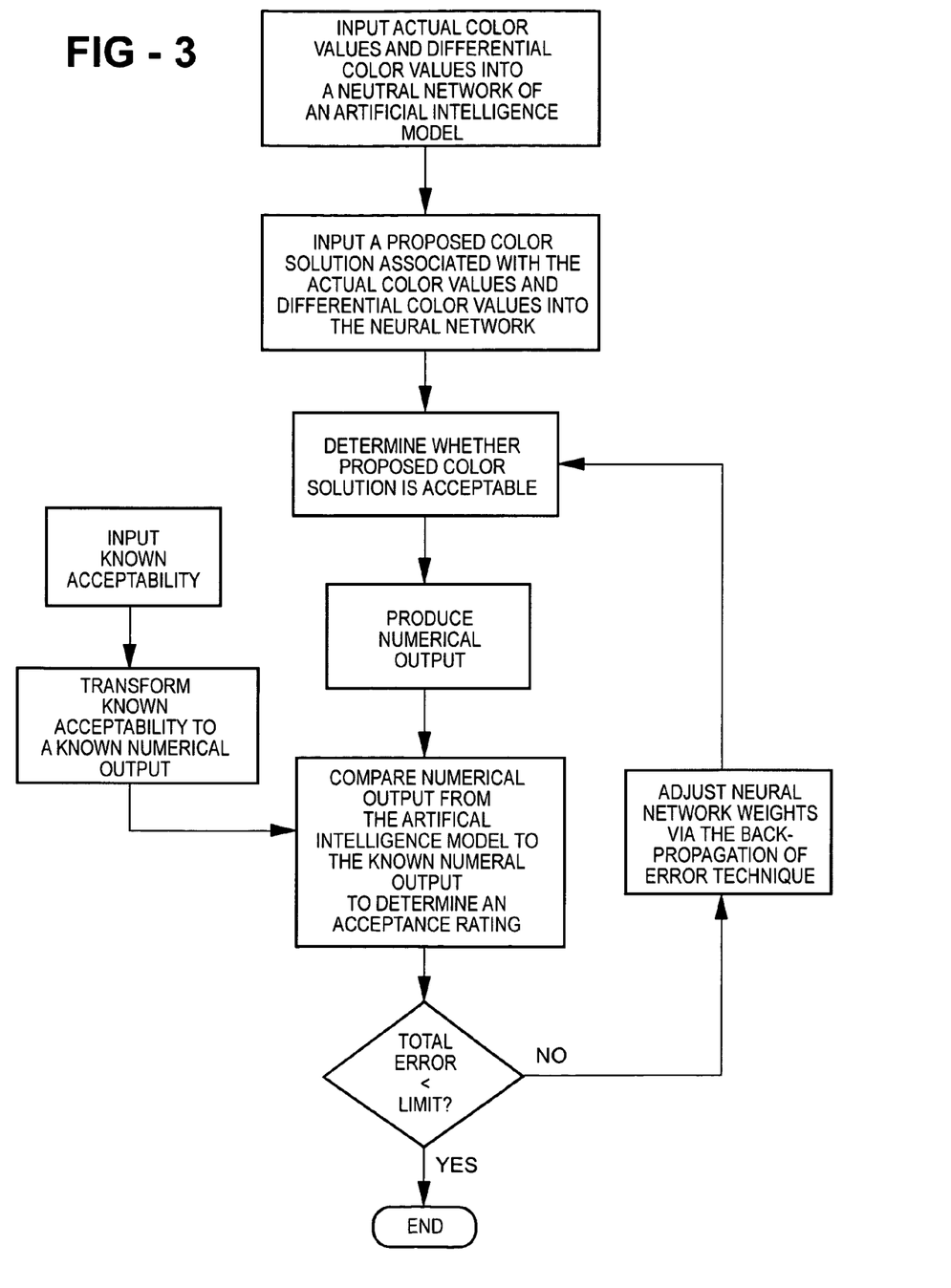
FIG. 3 is a block diagram depicting the training of the neural network of FIG. 2.

Turning to FIG. 3, a training of the back propagation neural network will now be discussed. In particular, the artificial intelligence model, or neural network, is trained for determining acceptability of a proposed color solution. The method of training the neural network includes the initial step of inputting actual color values and differential color values to the input layer of the neural network. A proposed color solution associated with the inputted actual color values and the inputted differential color values is also inputted into the input layer of the neural network. The neural network now has all the required information and a numerical output, indicative of the acceptability of the proposed color solution, is produced. A weighted factor to the color values in the hidden layer is used to determine the acceptability of the numerical output.

The numerical output is fed into a comparator. A known acceptability of the proposed color solution is first converted into a known numerical output and then the known acceptability is also inputted to the comparator. The known acceptability is a previously determined and known acceptability rating for the proposed color solution that was inputted into the neural network. The comparator compares the output of the neural network with the previously known acceptability of the proposed color solution and produces an error value. If the neural network is fully trained and operating properly, the error value will be negligible and no further action would be taken. However, if the neural network is in the process of being trained, then the error value will be relatively large. The error value is compared to an error limit to determine error variation. If the error value exceeds the error limit, then error feedback is provided to the neural network corresponding to the error variation. The weighted factor is then adjusted according to the error feedback. Typically, this training procedure will be initiated for hundreds or even thousands of different inputs in order to adequately train the neural network.

One embodiment of a basic computer system 400 for managing and providing the color solutions, such as paint, pigments or dye formulations, discussed above is schematically illustrated in FIG. 4. The system 400 includes a first module 402 located at a remote location 404, such as a customer site. Preferably, the first module 402 is implemented on the computer, such as a personal computer or wireless computing device. The first module 402 is adapted to be operated by a user or operator 406, i.e., the customer. The operator 406 inputs actual color values into the first module 402. The actual color values can be inputted by including a paint identifier (or color code) which identifies the actual color values or paint color of a subject part 408, such as an automobile body part. Alternatively, actual color values could be inputted through a color measurement device 410. The color measurement device 410 is used to provide color measurements, which are an indication of the actual color values of the subject part 408 to be painted. Preferably, the color measurement device 410 is a spectrophotometer such as is available from X-Rite, Incorporated of Grandville, Mich. as model no. MA58. Alternatively, the color measurement device 410 may be a spherical geometry color measuring device, a digital camera or other suitable device.

Figure 4:
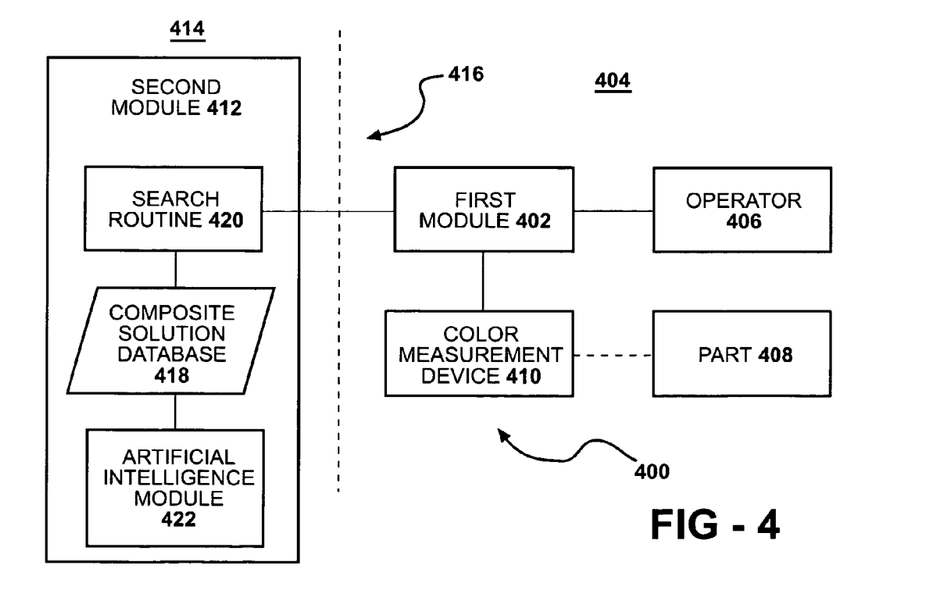
FIG. 4 is a block diagram of a color management and solution distribution system.

The first module 402 is coupled to a second computer based module 412 located at a central location 414, such as the paint manufacturer's facility. The first 402 and second 412 computer based modules are coupled across a computer network 416. In the preferred embodiment, the computer network 416 is the Internet.

The second module 412 receives the actual color values from the operator 406 via the first module 402 and the computer network 416. The second module 412 includes a composite solution database 418, a search engine or routine 420, and the artificial intelligence model 422. The search routine 420 is adapted to search the composite solution database 418 and determine a proposed color solution and associated second color values as a function of the inputted actual color values. The artificial intelligence model 422 receives the actual color values, differential color values, and can receive the proposed color solution. As also discussed above, the artificial intelligence model 422 is adapted to determine if the proposed color solution, chosen by the search routine 420 based on the inputted actual color values into the first module 402, is acceptable.

Figure 5:
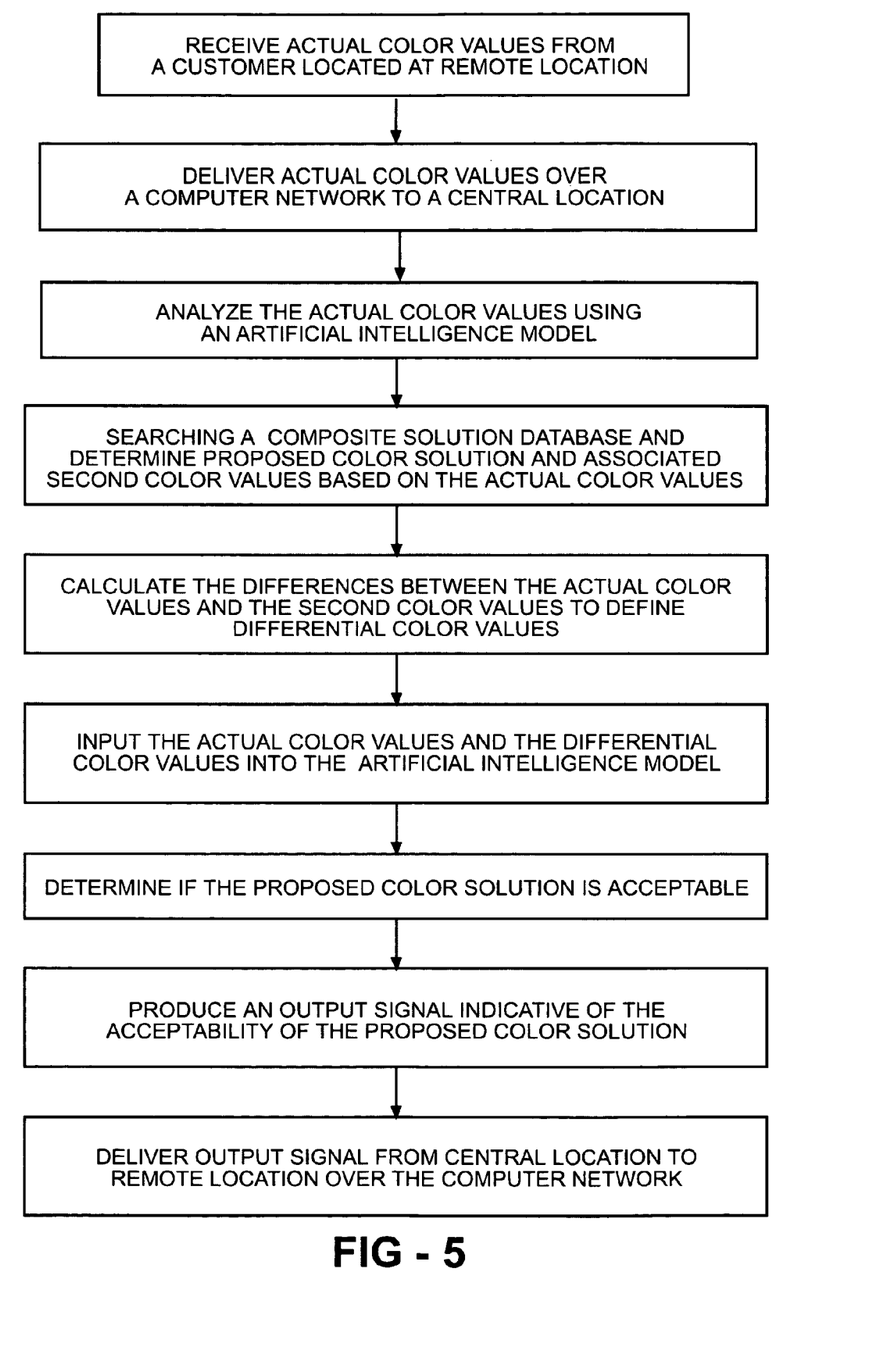
FIG. 5 is a flow diagram of a color management and solution distribution method.

With reference to FIG. 5, a computer based method for performing the steps of the system shown in FIG. 4 will now be explained. The actual color values are received from the customer located at a remote location. The actual color values from the remote location are delivered to a central location over the computer network. The actual color values are then input into the computer at the central location. The composite solution database associated with the computer of the central location is searched to determine the proposed color solution and associated second color values based on the inputted actual color values. The differences between the actual color values and the second color values are determined utilizing the computer to define differential color values. The actual color values and the differential color values are inputted into the artificial intelligence model. As mentioned above, the artificial intelligence model determines if the proposed color solution is acceptable. An output can be produced, which is indicative of the acceptability of the proposed color solution. The output is now delivered from the central location to the remote location over the computer network such that the customer can evaluate the output With particular reference to FIGS. 4 and 6, a system 600 for managing and providing the proposed color solutions using derived color tolerances is provided. The system 600 includes three databases: the composite solution database 418, a color measurement database 602, and a customer and solution usage database 604.

Figure 6:
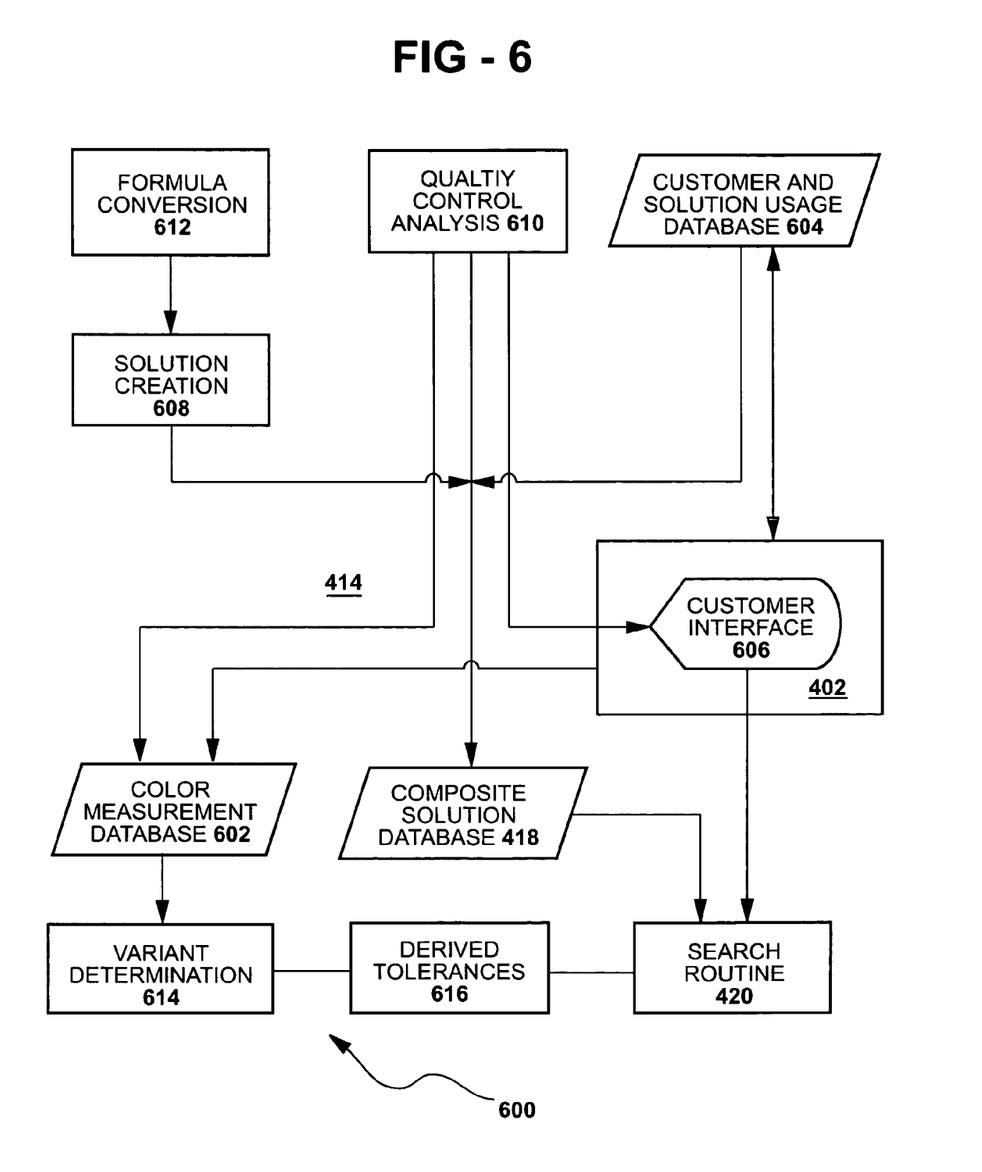
FIG. 6 is a block diagram of a color management and solution distribution method.

A customer interface 606 is implemented on the first module 402 located at the remote location 404. The customer interface 606 allows the operator 406 to log on to the system, communicate with the system 400, 600, e.g., to request proposed color solutions, to communicate actual color values, and to receive proposed color solutions from the system 400, 600. The customer interface 606 is graphical in nature, and, preferably, is accessed through a generic world wide web (WWW) browser, such as Microsoft™ Internet Explorer, available from Microsoft of Redmond, Wash.

The customer interface 606 may be implemented in hyper text markup language (HTML), the JAVA language, and may include JavaScript. The system 600 also includes several processes: a solution creation process 608, a quality control analysis 610, a formula conversion process 612, a variant determination process 614, and a derived tolerance process 616.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A method of determining an acceptability of a proposed color solution for an item using a computer and an artificial intelligence model, said method comprising the steps of:
    determining actual color values associated with the item;
    inputting the actual color values into the computer;
    determining the proposed color solution and associated second color values;
    calculating the differences between the actual color values and the second color values by utilizing the computer to define differential color values;
    inputting the actual color values and the differential color values into the artificial intelligence model;
    determining if the proposed color solution is acceptable by utilizing the artificial intelligence model; and
    producing an output indicative of the acceptability of the proposed color solution.

2. A method as set forth in claim 1 wherein the step of determining the proposed color solution and associated second color values is further defined as searching a database for the proposed color solution based on the inputted actual color values.

3. A method as set forth in claim 1 further including the step of transforming the output into a desired format.

4. A method as set forth in claim 3 wherein the step of transforming the output is further defined as transforming the output into a numerical variable indicative of the acceptability of the output.

5. A method as set forth in claim 4 wherein the step of transforming the output is further defined as transforming the output into a fuzzy variable set.

6. A method as set forth in claim 3 wherein the step of transforming the output is further defined as transforming the output into a descriptive output indicative of the acceptability of the output and displaying the descriptive output.

7. A method as set forth in claim 1 further including the step of training the artificial intelligence model for determining acceptability.

8. A method as set forth in claim 7 wherein the step of training the artificial intelligence model includes the step of comparing the output to a known acceptability of the proposed color solution.

9. A method as set forth in claim 7 wherein the artificial intelligence model is a neural network and further including the step of providing feedback to the neural network from the output.

10. A method as set forth in claim 9 wherein the neural network includes an input layer and an output layer and further including the step of providing feedback from the output to the input layer.

11. A computer-based method for providing an acceptability of a proposed color solution to a customer over a computer network, said method comprising the steps of:

receiving actual color values from the customer located at a remote location;

delivering the actual color values from the remote location to a central location over the computer network;

inputting the actual color values into a computer;

searching a composite solution database associated with the computer and determining a proposed color solution and associated second color values based on the inputted actual color values;

calculating the differences between the actual color values and the second color values utilizing the computer to define differential color values;

inputting the actual color values and the differential color values into an artificial intelligence model;

determining if the proposed color solution is acceptable by utilizing the artificial intelligence model; and producing an output indicative of the acceptability of the proposed color solution.

12. A method as set forth in claim 11 further including the step of delivering the output from the central location to the remote location over the computer network.

13. A method as set forth in claim 11 further including the step of transforming the output into a desired format.

14. A method as set forth in claim 13 wherein the step of transforming the output is further defined as transforming the output into a numerical variable indicative of the acceptability of the output.

15. A method as set forth in claim 14 wherein the step of transforming the output is further defined as transforming the output into a fuzzy variable set.

16. A method as set forth in claim 13 wherein the step of transforming the output is further defined as transforming the output into a descriptive output indicative of the acceptability of the output and displaying the descriptive output.

* * * * *